UNITED STATES PATENT OFFICE.

RAYMOND B. PRICE, OF MISHAWAKA, INDIANA.

PROCESS OF TREATING PLASTIC MATERIALS.

1,152,835.  Specification of Letters Patent.  Patented Sept. 7, 1915.

No Drawing.  Application filed January 9, 1912. Serial No. 670,344.

*To all whom it may concern:*

Be it known that I, RAYMOND B. PRICE, a citizen of the United States, residing at Mishawaka, in the county of St. Joseph, State of Indiana, have invented new and useful Improvements in Processes of Treating Plastic Materials, of which the following is a specification.

My invention relates to the treating of plastic materials, such as rubber and the like, to set the same, and has particular reference to the subjection of the material being treated to the action of the heat conveying or containing medium while the latter is subjected to a pressure greatly in excess of that expansive pressure of said heat conveying or containing medium which is due to the application of the treating heat thereto.

Having particular reference to the employment of a liquid heat-transmitting medium, I have found that a solution of calcium chlorid possesses desirable qualities, and I have also found that whereas while heretofore a liquid medium has been employed under a comparatively low pressure in excess of its expansive pressure due to the heat, e. g., a pressure usually approximating 50 pounds, and never, to my knowledge, exceeding 125 pounds, it is contemplated under my present invention to employ a hydraulic pressure on the solution of calcium chlorid or other liquid medium far in excess of the pressures above mentioned and which may run as high even as 5,000 pounds or more.

I have found in practice that a pressure of 500 pounds has produced results in compacting the material being treated to a much greater degree than under the low pressure heretofore used. In fact it has been found that while under ordinary conditions entrapped air and other fluids more than double in volume under the vulcanizing heat, by using this excessive pressure I not only prevent this expansion but will even contract the same, so that a highly compressed homogeneous body will be produced. And this is true in connection with the use of such mediums as calcium chlorid, glycerin, waxes and sulfur as the heat conveying medium. I do not, however, wish to be understood as limiting myself to the use of the enumerated mediums, as my invention contemplates the use of any other liquid solution, or water, or even a metal bath fusible below the vulcanizing temperature.

It will be understood that in employing a liquid medium it has always been necessary to provide a steam or air space to take care of the expansion of the liquid under the heat which would otherwise destroy the container, so that under such conditions the increase in pressure due to the heating would be comparatively slight, and it is to this expansion that I refer when I speak of the pressure produced by the expansive action of the medium under the heat. In fact, a container holding the material to be set might be filled with a fluid and heated to the setting temperature, provided there be provided in connection therewith an expansion chamber, and by employing a piston or the like in said chamber a controllable pressure greatly in excess of that heretofore employed might be obtained, said pressure greatly exceeding any that would be produced under present customary methods. And this construction would at the same time avoid the use of a large quantity of the surrounding fluid, gas or paste. Nor do I wish to limit my present invention to the use of this abnormally high pressure in connection with a liquid heat conveying agent, as I contemplate its use, to the extent that it may be possible, in connection with any known gas, such as air or other gas, steam and the like. Or I may surround the article to be treated with a substance not as fluid as a salt solution, for instance, but one more resembling a slippery powder, such, for instance, as a mixture of powdered talc and glycerin, which could be compressed and in turn transmit said pressure in all directions. In other words, my present invention is directed solely to the application of abnormally high pressure upon the material being heated during the treatment, and is not intended to be limited in any degree as to the character of the containing medium, whether gaseous or liquid.

Having thus described my invention, what I claim as new and desire to secure by Letters Patent is:

1. The process of treating plastic material, which consists in surrounding it during the setting operation with a heating medium having an affinity for moisture and subjecting the medium to a pressure greatly in excess of that produced by the expansive action of said medium under the heat.

2. The process of vulcanizing plastic material, which consists in surrounding it during the vulcanizing operation with a heating medium having an affinity for moisture and subjecting the medium to a pressure greatly in excess of that produced by the expansive action of said medium under the vulcanizing heat.

3. The process of vulcanizing plastic material consisting of surrounding it during vulcanization with a fluid medium having an affinity for moisture and subjecting the medium to approximately 500 lbs. pressure.

In testimony whereof, I have hereunto set my hand in the presence of two subscribing witnesses.

RAYMOND B. PRICE.

Witnesses:
A. M. Disch,
A. R. Boardman.